(12) United States Patent
McFarland et al.

(10) Patent No.: US 10,273,798 B2
(45) Date of Patent: Apr. 30, 2019

(54) DOWNHOLE RUNNING CABLE DEPTH MEASUREMENT

(71) Applicant: Weatherford Technology Holdings, LLC, Houston, TX (US)

(72) Inventors: Bradley J. McFarland, Houston, TX (US); Andrew J. Baker, Houston, TX (US); George J. Rodger, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 197 days.

(21) Appl. No.: 15/313,039

(22) PCT Filed: Jun. 5, 2015

(86) PCT No.: PCT/US2015/034444
§ 371 (c)(1),
(2) Date: Nov. 21, 2016

(87) PCT Pub. No.: WO2015/188082
PCT Pub. Date: Dec. 10, 2015

(65) Prior Publication Data
US 2017/0198530 A1    Jul. 13, 2017

Related U.S. Application Data

(60) Provisional application No. 62/008,170, filed on Jun. 5, 2014.

(51) Int. Cl.
E21B 47/01    (2012.01)
E21B 23/14    (2006.01)
(Continued)

(52) U.S. Cl.
CPC ............ *E21B 47/01* (2013.01); *E21B 17/003* (2013.01); *E21B 19/008* (2013.01); *E21B 23/14* (2013.01);
(Continued)

(58) Field of Classification Search
CPC ........ E21B 47/01; E21B 19/08; E21B 19/084; E21B 47/09; E21B 47/04; E21B 17/20;
(Continued)

(56) References Cited

U.S. PATENT DOCUMENTS 3,067,519 A    12/1962    Swift
4,852,263 A *    8/1989    Kerr ........................ E21B 47/04
                                                                    33/735
(Continued)

OTHER PUBLICATIONS

Holesinger, T G et al., "Carbon Nanotube Composite Cables for Ultra-Deepwater Oil and Gas Fields," C 140TC-P-1506-OTC, May 8, 2014, 1-pgs.
(Continued)

*Primary Examiner* — Brad Harcourt
(74) *Attorney, Agent, or Firm* — Blank Rome, LLP (57) ABSTRACT

A cable is used for running a load between surface and downhole in a well. The cable includes one or more wires composed of a non-metallic material. Each of the one or more wires bears the load from the surface and can electrically conduct between the surface and downhole. An insulating material is disposed about the one or more wires and insulates the electrical conduction. The non-metallic material includes a carbon nanotube wire. A jacket can be disposed about the insulating material, and the jacket can be composed a non-metallic material also, such as carbon nanotube wire. Markers disposed at predefined distances along the length of the cable are used to determine the deployed length of the cable.

26 Claims, 5 Drawing Sheets

(51) Int. Cl.
*E21B 33/072* (2006.01)
*E21B 47/04* (2012.01)
*E21B 47/09* (2012.01)
*E21B 47/12* (2012.01)
*E21B 17/00* (2006.01)
*E21B 19/00* (2006.01)
*E21B 47/00* (2012.01)
*G01D 5/02* (2006.01)
*G01D 5/26* (2006.01)
*H01B 1/04* (2006.01)
*H01B 7/02* (2006.01)
*H01B 7/36* (2006.01)

(52) U.S. Cl.
CPC ............ *E21B 33/072* (2013.01); *E21B 47/00* (2013.01); *E21B 47/04* (2013.01); *E21B 47/09* (2013.01); *E21B 47/12* (2013.01); *G01D 5/02* (2013.01); *G01D 5/26* (2013.01); *H01B 1/04* (2013.01); *H01B 7/0216* (2013.01); *H01B 7/36* (2013.01)

(58) Field of Classification Search
CPC ........ E21B 19/008; E21B 47/00; E21B 23/14; E21B 47/12; E21B 33/072; H01B 7/36; H01B 7/0216; G01D 5/02; G01D 5/26
See application file for complete search history.

(56) References Cited

U.S. PATENT DOCUMENTS

| | | | |
|---|---|---|---|
| 5,351,531 A * | 10/1994 | Kerr | E21B 47/04 324/206 |
| 2007/0131418 A1 | 6/2007 | Barrow et al. | |
| 2009/0123119 A1 | 5/2009 | Varkey | |
| 2012/0125656 A1 * | 5/2012 | Wei | B82Y 30/00 174/103 |
| 2012/0267141 A1 | 10/2012 | Kamiyama et al. | |

OTHER PUBLICATIONS

Ajayan, P. M. et al., "Application of Carbon Nanotubes," Carbon Nanotubes, Jan. 1, 2001, pp. 391-425.

Baughman, R H et al., "Carbon nanotubes—The route toward applications," Science, American Assoc for the Advancement of Science, Aug. 2, 2002.

Int'l Search Report in counterpart PCT Appl. PCT/US2015/034444, dated Nov. 2, 2015, 4-pgs.

Written Opinion in counterpart PCT Appl. PCT/US2015/03/111,I, dated Nov. 2, 2015, 5-pgs.

\* cited by examiner

DOWNHOLE RUNNING CABLE DEPTH MEASUREMENT

BACKGROUND OF THE DISCLOSURE

Downhole running cables are used in the oil and gas industry for deploying and retrieving well intervention and logging equipment in a well. For example, tools can be deployed downhole using a slickline spooled out from a drum and guided over sheaves before entering the well. Steel wires are generally chosen for such services to meet the rigorous physical requirements of the service while maintaining tensile strength without sustaining damage. However, if the deployed tool relies on electrical signals, steel wires are not typically used to for communicating the electrical signals. Instead, copper conductors are used for this purposes. Since the copper cannot sustain load, the cable is reinforced with steel wire.

Figure 1:
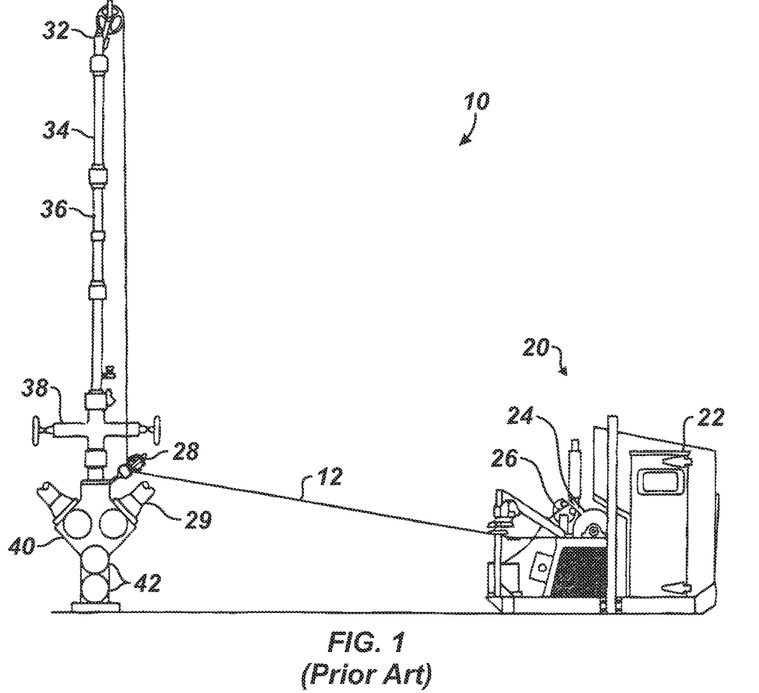
FIG. 1 illustrates a typical rig up system for running cable downhole for various purposes.

FIG. 1 illustrates a typical rig up system 10 for running cable 12 downhole for various purposes. The system 10 is shown for slickline, but the rig up for wireline (e-line), braided line, Heavy Duty Wireline Fishing (HDWF) line, and the like may use the same general configuration. The difference is that wireline (e-line), braided line, and HDWF line use a grease injection system to maintain well pressure. As shown, slickline instead uses a stuffing box 32.

The cable 12 (e.g., slickline, braided wireline, electric line, etc.) passes from a drum 22 in a deployment unit 20 to a hay pulley 28, which directs the cable 12 to the sheave on the stuffing box 32. The cable 12 enters the stuffing box 32, passes through a chemical injection sub 34 and a lubricator 36, and passes to a secondary barrier 38 or blow out preventer. Eventually, the cable 12 passes to the Christmas tree 40 through the swab and master valves 42, and then to the well for its intended purposes. Various other components are used with the system as well, but are not described here. When the cable 12 is used for intervention, for example, the rig up system 10 may include cable cutter subs, a tool trap, a tool catcher, check valves, etc.

The stuffing box 32 packs off around the cable 12. The chemical injection sub 34 applies various agents and corrosion inhibitors to the cable 12 during operations. The lubricator 36 is used for inserting and retrieving a tool string (not shown) when the well is under pressure. The secondary barrier 38 can use ram seals to close off around the cable 12 in the event of an emergency or essential maintenance.

For those cables 12 with a smooth outer surface, the stuffing box 32 can use elastomeric seals. Otherwise, grease-injected sealing hardware is used with served or braided cable surfaces. Where a stuffing box 32 cannot be used, for example, a grease injection control head (not shown) can create a seal around the moving cable 12 by injecting grease so the cable 12 can be run for intervention operations in wells under pressure.

The rig up's deployment unit 20 can be skid mounted on the rig or can be part of a deployment truck. The unit 20 stores the cable 12 on the drum 24 that feeds the cable 12 on and off of the unit 20. A winch for the drum 24 has a hydraulic drive powered by a diesel engine or electric power pack that drives the drum 24 to feed or pull the cable 12. The unit 20 may also include depth and tension systems. For example, a weight indicator sensor 29 can be used to measure line tension on the cable 12, and a depth counter 26 can be used to measure the length of cable 12.

Figure 2:
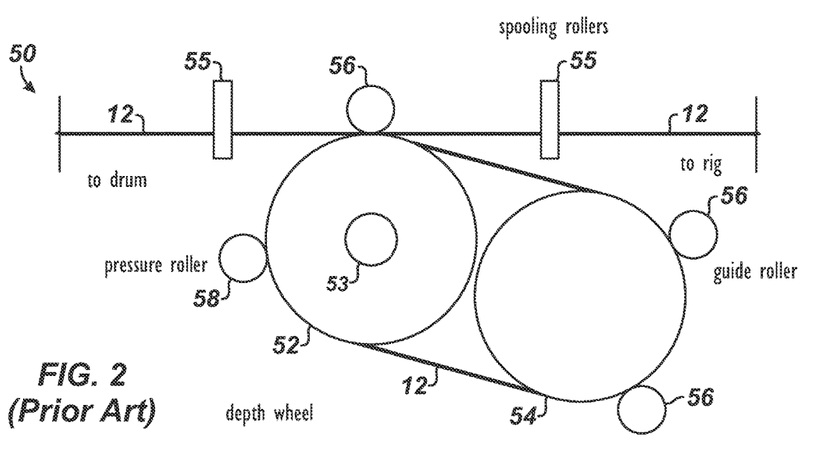
FIG. 2 shows a measuring device that can measure depth and tension for the rig up system.

As an example, FIG. 2 schematically shows a measuring device 50 that can measure depth and tension for the deployment unit (20). This measuring device 50 uses two wheels 52, 54 to measure depth of the cable 12. The device 50 mounts in front of the drum (24) on a spooling mechanism and can ride back and forth on linear bearings. The cable 12 from the drum (24) completely wraps around both wheels 52, 54 and extends from the wheels 52, 54 to other components to go to the well. Spooling rollers 55, guide rollers 56, and a pressure wheel 58 keep the cable 12 in the wheels 52, 54 and assist in the spooling of the cable 12. Line tension is measured from a load pin axle 53 for the tension wheel 52. A hydraulic load cell may also be included that measures cable tension independently of the electronic load pin. Depth information is provided by an encoder 57 to the unit's control panel (22), which accounts for the size and stretch of the cable.

The cable 12 can come in various arrangements and geometries. Some forms of downhole running cables, such as wirelines, e-lines, braided lines, etc., have wires or strands. During use, the cables 12 are subject to elastic elongation, permanent stretch, breakage, and the like based on the loads, twists, bends, and other actions subjected to the cable. For example, a swivel connector in a cable attachment system may subject cable to various amounts of elongation, which may eventually lead to failure. Another source of stretch to the cable comes from elastic extension of the cable under load, which is typically characterized as linear in nature. Permanent elongation can occur when high loads on the cable produce uniform plastic yielding. Additionally, localized plastic yielding may occur after a maximum breaking load is exceeded. When the cable is moved in the well, frictional forces also act on the cable and can add to the line tension especially during recovery.

Many cables have helically wound lines that generate torque when under axial load. The cables therefore tend to unlay or untwist to some extent under certain circumstances. Factors surrounding this behavior can be very difficult to predict. Even thermal expansion can occur during use of the cable, although thermal effects may not alter the mechanical properties of the cable's composition.

With all of the forms of elongation, twisting, plastic deformation, etc. that a cable can encounter, the service history of the cable needs to monitored and logged to determine what loads and actions the cable has been subjected to so an assessment can be made whether the cable is still serviceable or not. Additionally, operators need to monitor and tabulate the length of the cable to know where tools are actually located in the well and to perform various operations downhole with the cable.

Although there are many types of downhole cables known in the art and even though they may be effective, operators are continually increasing the types of uses for downhole cables and subjecting the cables to ever changing conditions and environments. To that end, the subject matter of the present disclosure is directed to overcoming, or at least reducing the effects of, one or more of the problems set forth above.

SUMMARY OF THE DISCLOSURE

In one embodiment, a system is used for running a load between surface and downhole of a well. The system comprises a cable, a plurality of markers, and a unit. The cable has at least one wire of continuous length composed of a carbon nano-tube material. Each of the at least one wire acts as a load-bearing member bearing the load when run between surface and downhole. The markers are disposed at predefined distances along the cable. Because the cable comprises the at least one wire of continuous length composed of the carbon nano-tube material, the cable is subject to limited stretching when bearing the load so that the predefined distance between the markers is indicative of the deployed length of the cable even when bearing the load. The unit deploys the cable from a cable source between surface and downhole and detects passage of the markers. From this, the unit determines a deployed length of the cable from the cable source based on the predefined distances for the detected passage of the markers.

In another embodiment, a method is used for running a load between surface and downhole of a well. The method involves disposing a cable having at least one wire composed of a carbon nano-tube material on a cable source at surface of the well. The method involves directing the cable between the cable source and the well and running the cable between surface and downhole by bearing the load between the surface and downhole with each of the at least one wire of the cable. The method involves determining a deployed length of the cable from the cable source by detecting passage of markers disposed at predefined distances along the cable.

Various types of markers can be used. For example, the markers can include elements of metallic, magnetizable, or magnetized material, and the unit can include a sensing transducer detecting the passage of the elements. The markers can include radial frequency identification tags, and the unit can include a radio frequency transceiver detecting the passage of the tags. The markers can include optical elements disposed externally on the cable, and the unit can include an optical sensor detecting the passage of the optical elements. The markers can include mechanical elements disposed externally on the cable, and the unit can include a mechanical sensor detecting the passage of the mechanical elements.

For its part, the unit can include a speed detector determining a speed of pay out of the cable from the cable source and can include a clock measuring a time between the detected passage of the markers. During operation, the unit determines the deployed length of the cable paid out based on the speed of the payout, the time between the detected passage of the markers, and the predefined distances between the markers along the cable.

The foregoing summary is not intended to summarize each potential embodiment or every aspect of the present disclosure.

DETAILED DESCRIPTION OF THE DISCLOSURE

Figure 3:
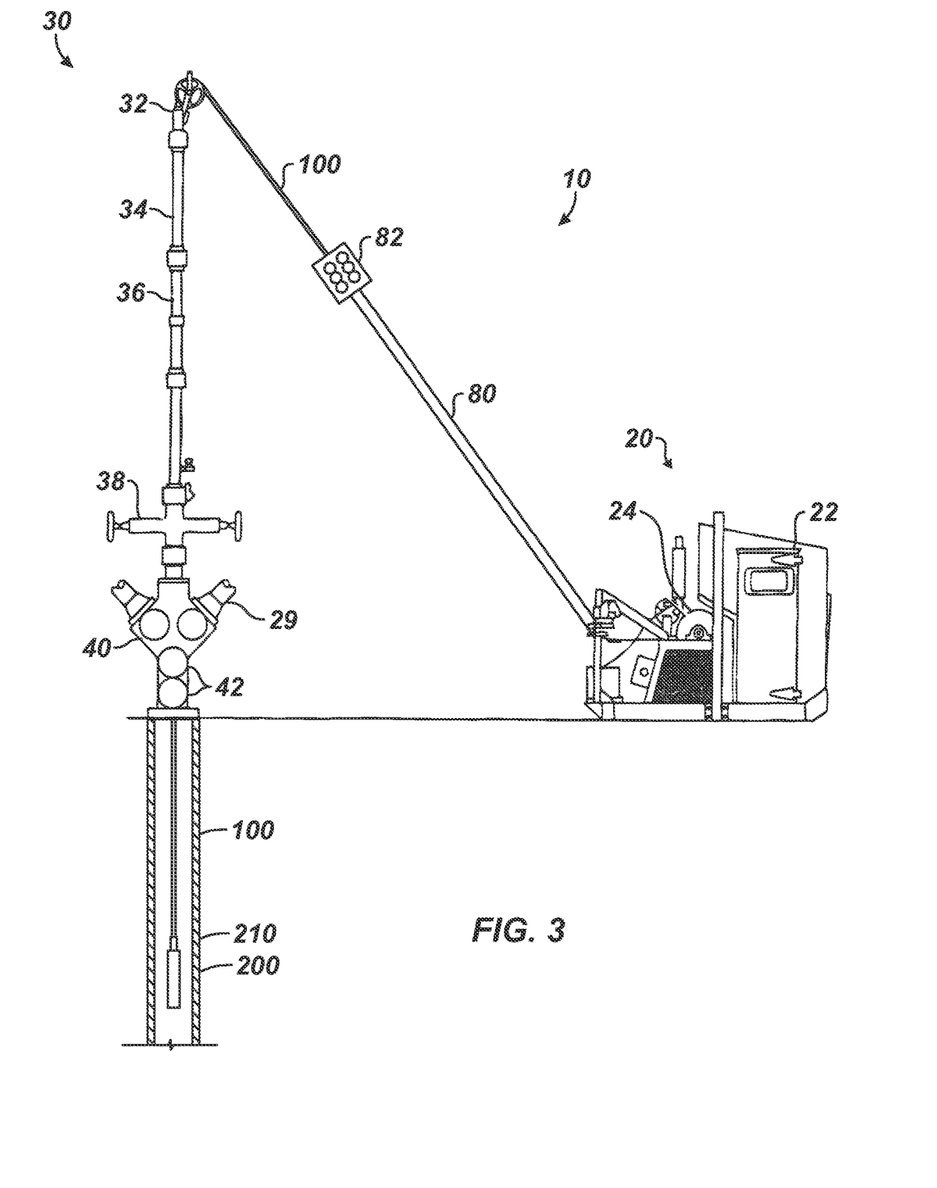
FIG. 3 illustrates a rig up system for running cable of the present disclosure downhole for various purposes.

FIG. 3 illustrates a rig up system 10 for running cable 100 of the present disclosure downhole for various purposes. The cable 100 of the present disclosure has a carbon nanotube core element acting as a load-bearing member and a conductor. Further details of the configuration of the cable 100 are discussed later.

In the rig up system 10, the cable 100 passes from a drum 22 in a deployment unit 20 to an arm 80, which directs the cable 100 to the sheave 32 on the stuffing box 34. The arm 80 can be manipulated using crane components (not shown) or the like to situate the cable 100 more directly from the unit 20 to the Christmas tree 30 and can include guide unit 82, rollers, goose neck, and the like. The guide unit 82 can also include a conventional system for determining the length of the cable paid out and tension on the line.

The cable 100 enters the stuffing box 34 and passes through a lubricator 36 to a secondary barrier 38 or blow out preventer. Eventually, the cable 100 passes to the Christmas tree 40 through the swab and master valves 42, and then to the well for its intended purposes. Various other components are used with the system 10 as well, but are not described here. When the cable 100 is used for intervention, for example, the rig up system 10 may include cable cutter subs, a tool trap, a tool catcher, check valves, etc.

The cable 100 having the carbon nanotube core element as the load bearing and conductive member has a smooth, impermeable outer surface so the rig up system 10 can use the stuffing box 34 packs off around the cable 100. A grease injection system is not needed, although it could be used when necessary. Additionally, due to the inert nature of the disclosed cable 100, a chemical injection sub 34 for coating corrosive resistant material on the cable 100 may not be used, although it could be used if necessary.

As before, the rig up's deployment unit 20 can be skid mounted on the rig or can be part of a deployment truck. The unit 20 stores the cable 100 on the drum 24 that feeds the cable 100 in and out of the unit 20. A winch for the drum 24 typically has a hydraulic drive powered by a diesel engine that drives the drum 24 to feed or pull the cable 100. The unit 20 may also include communication, tension, and depth systems.

Embodiments of the cable 100 for use with the disclosed system 10 are described in co-pending PCT application entitled "Downhole Running Cable Having Non-Metallic Conducting and Load Bearing Wire" by Bradley J. McFarland, Andrew J. Baker, and George J. Rodger, which is filed herewith and is incorporated herein by reference in its entirety. In general, the cable 100 has a carbon nanotube core element in the form of one or more wires and/or jacket making up its load bearing and conductive members.

Figures 4A, 4B:
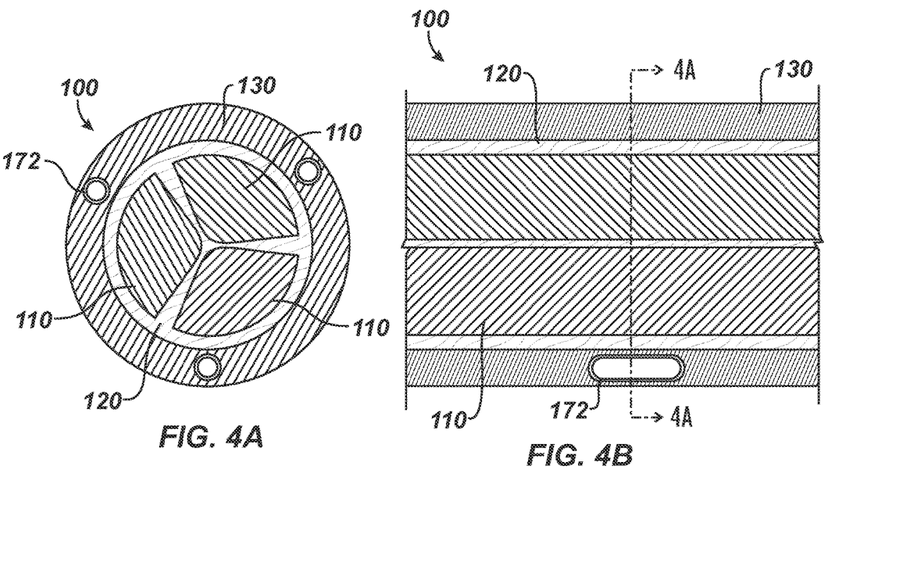
FIG. 4A illustrates an end-sectional view of a non-metallic cable according to the present disclosure for use as slickline, electric wireline (e-line), braided line, Heavy Duty Wireline Fishing (HDWF) line, or the like for downhole applications in a well.
FIG. 4B illustrates a cross-section of the disclosed cable.

FIG. 4A illustrates an end section of a non-metallic cable 100 according to the present disclosure for use as a slickline, an electric wireline (e-line), a braided line, a Heavy Duty Wireline Fishing (HDWF) line, or the like for downhole applications in a well. The cable 100 uses carbon nanotube wire 110 as the core element acting as the load bearing member and the conductor for the cable 100. In the sense used herein, a load-bearing member at least describes the component or components of the disclosed cable 100 that collectively carry the bulk of the tensile load to which the cable is subjected due to weight of a tool, pulling action, jarring, etc. As discussed previously, the cable 100 can be used for depth correlations and can pass signals or power. Thus, a conductor as used here in at least describes a component or components of the cable for conducting electrical power, signals, telemetry, etc.

In the depicted arrangement, the cable 100 includes three carbon nanotube wires 110 insulated by an insulation material 120. In general, the cable 100 can have one or more carbon nanotube wires 110, and three are shown merely for illustration. The insulating material 120 can be PEEK, nylon, or other suitable material for electrical isolation and flexibility.

The cable 100 also includes a jacket armor 130 of carbon nanotube. This jacket armor 130 preferably forms a smooth outer surface so the cable 100 can be used without the need for a grease injection system. For example, the smooth outer surface can be formed by a braiding or weave of carbon nanotube wire for the jacket armor 130 around the inner insulation material 120 and inner wires 110.

One particular source of the carbon nanotube wire 110 is CurTran LLC of Houston, Tex. The inner load and conductor wires 110 can be formed as continuous strands from carbon nanotube in a wire forming process. In general, the wire forming process produces filaments, which are then processed to form the desired wire size. Run together to form the core of the final cable 100, the wires 110 are extruded with the insulation material 120. Finally, the jacket armor 130 is braided, woven, wound, or otherwise formed around the outside of the insulated core for the disclosed cable 100.

As noted herein, the carbon nano-tube wire 110 is a non-metallic conductor and load bearing member for the cable 100. Compared to other conductors and load bearing wires, the carbon nanotube wire 110 for the disclosed cable 100 has a number of advantages. For conductivity, the wire 110 has low resistance, making it a good conductor of electricity, and the wire 110 has low impedance, which can reduce power losses. The wire 110 can also be well-suited for signal transmission and reduced noise.

As to mechanical properties, the wire 110 is light weight and has a low coefficient of thermal expansion (CTE), and the wire 110 is composed of a non-corrosive and inert material for use in harsh environments, such as a wellbore. Additionally, the wire 110 has high strength and is not subject to the same issues of fatigue as other wires.

As noted herein, the cable 100 conveys tools and equipment into and out of a wellbore. To do this, the cable 100 has the non-metallic wire 110 as the principal load bearing member. Moreover, the load bearing member can also be a conductor for the cable. Accordingly, the conductors and the load-bearing members 110 of the cable 100 are one and the same and, hence, have the same tensile strength and conductivity, unlike the conventional cable whose copper conductor is different in tensile strength than the steal wires.

In general, the cable 100 can have one or more load bearing members and in turn can have one or more conductors. In one embodiment, one of the load-bearing members is the external jacket armor 130, which can also be a conductor if desired. Additionally, electrical current can be passed through the load bearing conductor(s) 110. In this way, electrical signals can be sent from surface to control downhole devices coupled to the cable 100. Likewise, electrical signals can be sent from downhole to surface to transfer information.

Typical sizes of the cable 100 can be comparable to those sizes used in conventional applications although the cable 100 in general can be smaller for the same application. The cable 100 can be of any desired length, such as 25,000-ft. Rather than being just a material reinforced with carbon nanotubes, the disclosed cable 100 is continuous, and the load bearing wires 110 are composed almost entirely of carbon, except for the small amount of void space.

During loading, the cable 100 stays in the elastic region so the cable 100 does not suffer from some of the restrictions of conventional cables, such as bend restrictions, etc. Therefore, the disclosed cable 100 can use tighter bend radii, drums, smaller sheaves, etc., during deployment and use. Because conventional cables can fatigue, their use needs to be logged. However, the disclosed cable 100 does not suffer from such fatigue. The demands for monitoring the disclosed cable 100 are less rigorous.

It is possible for the disclosed cable 100 to fail, however. This can be detected using the electrical properties of the disclosed cable 100. When the cable 100 is subjected to loads, for example, the breaking level of the disclosed cable 100 may be reached or surpassed depending on operations and circumstances. As the disclosed cable 100 reaches its maximum load, the electrical conductivity of the cable 100 increases. This is due in part to the further compaction of the void space in the carbon nanotube structure of the wire 110 when subjected to increased load.

By monitoring the electrical conductivity of the cable 100 during use, sensors at surface or elsewhere can detect the increase in conductivity should the cable 100 begin to reach its breaking point. For example, a sensor electrically connected to the cable 100 at the deployment unit (20), can sense the conduct of the cable 100 in a number of ways. If a threshold is reached, the deployment unit (20) can then automatically stop operations. Overall, the disclosed cable 100 can be operated at levels closer to its breaking strain because the cable 100 does not fatigue in the same way as a conventional metallic cable.

As shown in the sectional views of the cable 100 in FIGS. 4A-4B, the cable 100 includes one or more markers 172 disposed therein at a section of its length. Multiple markers 172 are disposed at predetermined distances from one another along the length of the cable 100. As opposed to the non-metallic wires, jacket armor, and any insulating material, the marker 172 is composed of a magnetizable or magnetized material, such as ferrous metal, permanent magnet, etc. The deployment unit (20) or the component of the system (10) can has a sensing transducer, such as a Hall Effect sensor, a proximity sensor, an electromagnetic sensor, or the like used to detect passage of the marker 172. The marker 172 can be an RFID tag responsive to a radio frequency transceiver to sense passage of the marker 172 relative to the transceiver.

The marker 172 can be disposed anywhere in the cable 100. Depending on the type of marker 172 used, the marker 172 may need to be electrically isolated from any portion of the wires 110, jacket armor 130, or other element of the cable 100. To improve detection for some types of markers 172, the marker 172 may preferably be disposed near the outer surface and may even be disposed externally. Additionally, the marker 172 may encompass all or part of the cable's circumference, or it may be a discrete element embedded in the cable 100. Selection of these particulars depends on the type of markers 172 and the sensing transducer used to detect the markers 172 as they passes when the cable is run in or out of the well.

Figure 5:
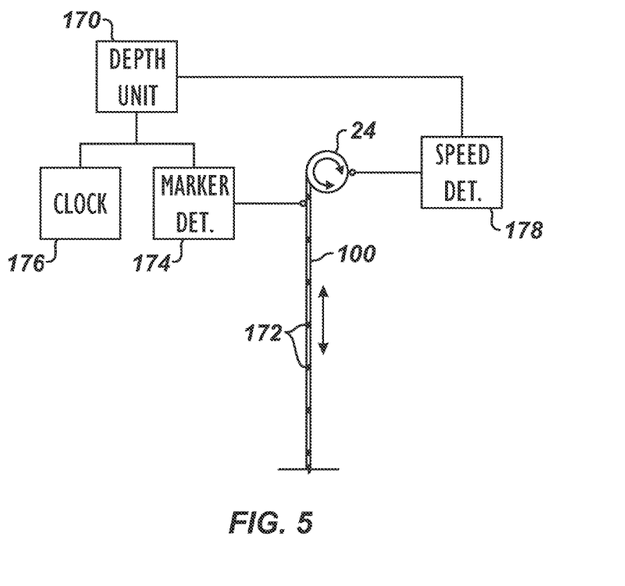
FIG. 5 illustrates a schematic of a depth monitoring arrangement for the disclosed cable.

FIG. 5 illustrates a schematic of a depth monitoring arrangement for the disclosed cable 100. As noted above, the cable 100 has a plurality of markers 172 disposed along its length at known separations. As will be discussed below, the cable 100 having the carbon nanotube core elements is not subject to extension elongation during use so the distance between markers 172 can be relatively consistent along the length of the cable.

A marker detector 174 reads the markers 172 in the non-metallic cable 100 and infers the depth of any tool (not shown) deployed thereon. The markers 172 can be metallic elements disposed in the non-metallic cable 100 so the detector 174 can sense a change in magnetic field associated with the passing marker 172. Other forms of detection can be used, including electrical, optical, Radio Frequency Identification, and the like, as disclosed here in.

A speed detector 178 associated with the drum 24 determines and records the speed of the pay out of the cable 100 using know techniques, and a clock 176 measures a time between signals from the markers 172. Based on the time between signals and the spooling speed of the cable 100, a depth unit 170 can determine the length of the cable 100 paid out, which can infer the depth of any tool on the cable 100 in the borehole.

Depth determination and control with a conventional cable is difficult because the cable tends to stretch substantially. Here, the stretch of the disclosed cable 100 can be as low as less than 1-ft per 1000-ft downhole so depth downhole can be determined rather directly without much accounting for stretch and variation along the length of the disclosed cable 100.

As noted above, the markers 172 on the cable 100 can use electrical, magnetic, and RFID, components. The markers 172 may be optical elements disposed externally on the cable 100 and detected with an optical sensor. The markers 172 may even be mechanical elements disposed externally on the cable 100 and detected with a mechanical sensor. Accordingly, the markers 172 as disclosed herein can be detected magnetically, optically, acoustically, mechanically, electrically, and the like.

Figure 6A:
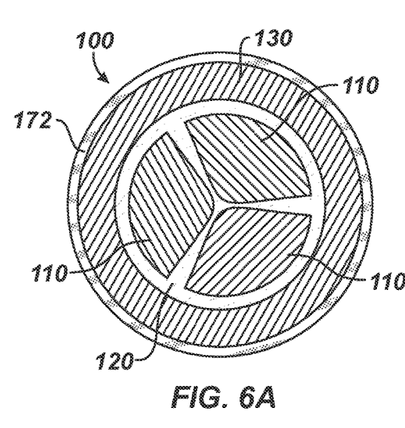
FIGS. 6A-6B illustrate an end section and a cross section of another non-metallic cable having an alternative type of marker according to the present disclosure.
Figure 6B:
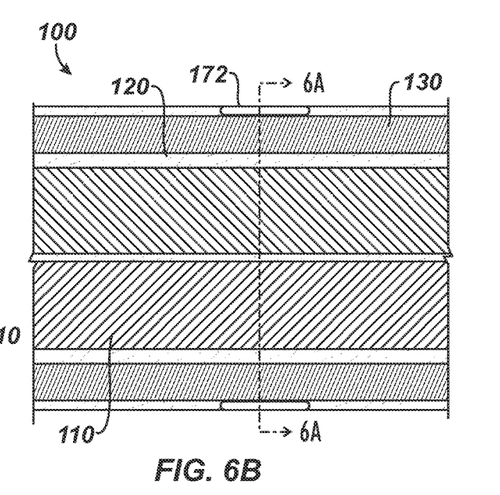

FIGS. 6A-6B illustrate an end-section and a cross-section of another non-metallic cable 100 having an alternative type of marker 172 according to the present disclosure. This marker 172 has the form of a band disposed around the circumference of the cable 100. As shown, the band-shaped marker 172 can be disposed in an outer plastic coating or sheath 140 of the cable 100, although it could be affixed alone on the armor 130 or embedded in the armor 130. Using such an external band-shaped marker 172 may facilitate detection and may be best suited for certain forms of detection, such as optical detection.

Figure 7A:
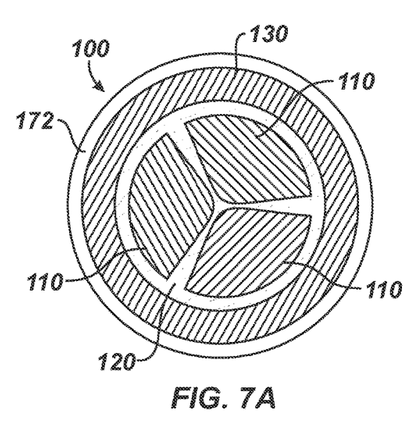
FIG. 7A-7B illustrate an end section and a cross section of another non-metallic cable having a yet another type of marker according to the present disclosure.
Figure 7B:
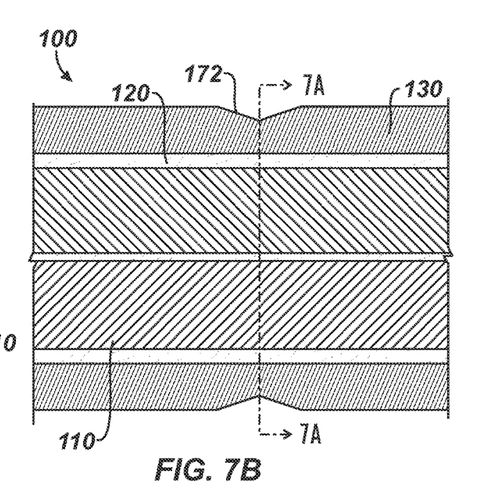

FIG. 7A-7B illustrate an end section and a cross section of another non-metallic cable 100 having a yet another type of marker 172 according to the present disclosure. This marker 172 has the form of a notch or profile disposed externally in the armor 130 to be detected mechanically as the cable 100 passes a mechanical detector. Rather than a notch or profile, the maker 172 can be an externally raised rib, band, or the like disposed or formed externally on the cable 100 to be mechanically detected.

Figure 8:
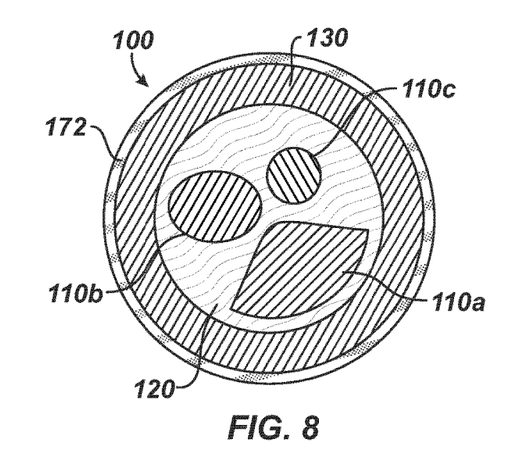
FIGS. 8-9 illustrate end sections of other non-metallic cable according to the present disclosure.
Figure 9:
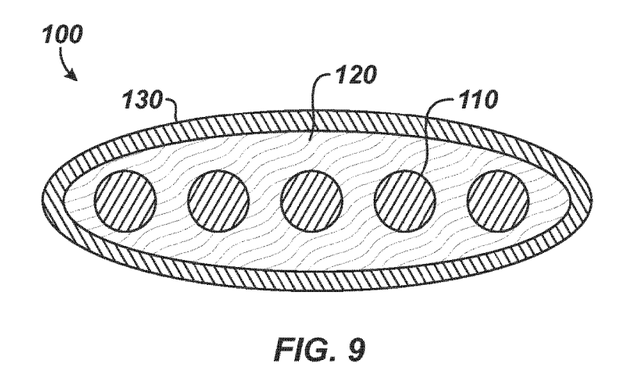

FIGS. 8-9 illustrate end sections of other non-metallic cable 100 according to the present disclosure. As shown in FIG. 8, the cable 100 can have at least some of the wires 110*a-c* with different cross-sections from one another. As shown in FIG. 9, the cable can have a non-circular cross-section.

Figure 10:
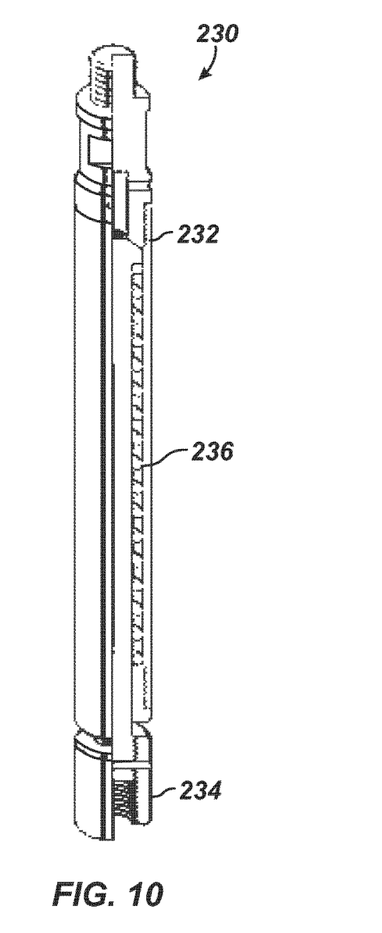
FIG. 10 illustrates a stretch simulator for use with the cable of the present disclosure.

FIG. 10 illustrates a stretch simulator 230 for use with a cable according to the present disclosure. As disclosed in the incorporated PCT application entitled "Downhole Running Cable Having Non-Metallic Conducting and Load Bearing Wire", the stretch simulator or accelerator 230 installs on a toolstring (not shown) immediately below a rope socket (not shown) for the cable (not shown). The stretch simulator 230 has a top section 232, a bottom section 234, and a spring or beveled washers 236 between them. The stretch simulator 230 works by the cable (100) pulling on the top section 232 while the bottom section 234 is held by a pulling tool (not shown). The beveled washers 236 are compressed, and as a jar (not shown) below fires, the beveled washers 236 expand which in turn accelerates the toolstring giving more impact.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

The invention claimed is:

1. A system for running a load between surface and downhole of a well, the system comprising:
    a cable having at least one core element disposed along its length and composed of carbon nano-tube material, the at least one core element acting as a load-bearing member bearing the load;
    a plurality of markers disposed at predefined distances along the cable, wherein the markers comprise mechanical elements disposed externally on the cable; and
    a unit deploying the cable from a cable source between surface and downhole, wherein the unit comprises a mechanical sensor mechanically detecting passage of the mechanical elements of the markers, the unit determining a deployed length of the cable from the cable source based on the predefined distances for the detected passage of the markers.

2. The system of claim 1, wherein the cable communicates with an electrical source between surface and downhole of the well; and wherein the at least one core element acts as both (i) the load-bearing member bearing the load and (ii) a conductor conducting with the electrical source.

3. The system of claim 1, wherein the cable comprises a jacket disposed externally about the at least one core element and forming an exterior of the cable, the jacket composed of electrically insulating material.

4. The system of claim 1, wherein the at least one core element comprises a plurality of wires conductively isolated from one another by an insulator of electrically insulating material.

5. The system of claim 4, wherein at least some of the wires comprise different cross-sections from one another.

6. The system of claim 4, wherein the cable comprises a jacket disposed externally about the insulator and forming an exterior of the cable, the jacket composed of a different material than the at least one core element and the insulator.

7. The system of claim 4, wherein the at least one core element of the cable comprises a jacket disposed externally about the insulator and forming an exterior of the cable, the sheath composed of carbon nano-tube material.

8. The system of claim 7, wherein the jacket acts as at least one of a load-bearing member and a conductor for the cable.

9. The system of claim 1, wherein the cable has a non-circular cross-section.

10. The system of claim 1,
wherein at least some of the markers comprise elements of metallic, magnetizable, or magnetized material, and wherein the unit comprises a sensing transducer detecting the passage of the elements;
wherein at least some of the markers comprise radio frequency identification tags, and wherein the unit comprises a radio frequency transceiver detecting the passage of the tags; and/or
wherein at least some of the markers comprise optical elements disposed externally on the cable, and wherein the unit comprises an optical sensor optically detecting the passage of the optical elements.

11. The system of claim 1, wherein the unit comprises:
a speed detector determining a speed of spooling of the cable on the cable source; and
a clock measuring a time between the detected passage of the markers,
wherein the unit determines the deployed length of the cable based on the speed of the spooling, the time between the detected passage of the markers, and the predefined distances between the markers along the cable.

12. The system of claim 11, wherein the unit accounts for a known stretch of the cable per paid out length when determining the deployed length of the cable.

13. The system of claim 1, wherein the unit directs the cable between the cable source and a wellhead at surface of a rig and runs the cable between surface and downhole.

14. The system of claim 13, wherein the unit comprises an arm extending from adjacent the cable source to adjacent a sheave at the wellhead, the arm feeding the cable along the arm between the cable source and the sheave.

15. The system of claim 14, wherein the unit comprises a drum as the cable source.

16. The system of claim 14, wherein the arm comprises a guide thereon guiding the movement of the downhole cable fed along the arm.

17. The system of claim 1, further comprising a tool disposed on the cable and deploying in the well as the load.

18. The system of claim 17, wherein the tool is selected from the group consisting of a logging tool, a wireline tool, a shifting tool, a pulling tool, and a mechanical jar.

19. The system of claim 17, further comprising a stretch simulator coupled between the cable and the tool.

20. A method of running a load between surface and downhole of a well, the method comprising:
disposing a cable having at least one core element disposed along its length and composed of carbon nano-tube material on a cable source, the cable having a plurality of markers disposed at predefined distances along the length, the markers comprising mechanical elements disposed externally on the cable;
directing the cable between the cable source and the well;
running the cable between surface and downhole by bearing the load between the surface and downhole with each of the at least one core element of the cable; and
determining a deployed length of the cable from the cable source by mechanically detecting, with a mechanical sensor, passage of the mechanical elements of the markers disposed at predefined distances along the cable.

21. The method of claim 20, wherein the cable communicates with an electrical source between surface and downhole of the well; and wherein running the cable comprises both bearing the load between surface and downhole with the at least one core element of the cable and conducting with the electrical source between surface and downhole with the at least one core element of the cable.

22. The method of claim 20, wherein directing the cable comprises extending an arm from adjacent the cable source to adjacent a sheave at a wellhead of the rig, and feeding the cable along the arm between the cable source and the sheave.

23. The method of claim 20, further comprising simulating stretch of the cable mechanically.

24. The method of claim 20, wherein detecting the passage of at least some of the markers comprise at least one of:
detecting the passage of elements comprising metallic, magnetizable, or magnetized material using a sensing transducer;
detecting the passage of radial frequency identification tags using a radio frequency transceiver; and
optically detecting the passage of optical elements disposed externally on the cable using an optical sensor.

25. The method of claim 20, wherein determining the deployed length of the cable from the cable source comprises:
determining a speed of spooling of the cable on the cable source; and
measuring a time between the detected passage of the markers,
determining the deployed length of the cable based on the speed of the spooling, the time between the detected passage of the markers, and the predefined distances between the markers along the cable.

26. The method of claim 25, wherein determining the deployed length of the cable from the cable source comprises accounting for a known stretch of the cable per paid out length.

* * * * *